US009460425B2

United States Patent
Williams, Jr.

(10) Patent No.: US 9,460,425 B2
(45) Date of Patent: Oct. 4, 2016

(54) SYSTEMS AND METHODS FOR DETERMINING CHECK INFORMATION

(71) Applicant: FIRST DATA CORPORATION, Greenwood Village, CO (US)

(72) Inventor: Charles R. Williams, Jr., Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 108 days.

(21) Appl. No.: 14/340,266

(22) Filed: Jul. 24, 2014

(65) Prior Publication Data

US 2015/0030307 A1   Jan. 29, 2015

Related U.S. Application Data

(60) Provisional application No. 61/858,371, filed on Jul. 25, 2013.

(51) Int. Cl.
| | | |
|---|---|---|
| *H04N 5/77* | (2006.01) | |
| *G06Q 20/04* | (2012.01) | |
| *G06K 9/00* | (2006.01) | |
| *G06K 9/03* | (2006.01) | |

(52) U.S. Cl.
CPC ......... *G06Q 20/042* (2013.01); *G06K 9/00442* (2013.01); *G06K 9/036* (2013.01); *G06K 2209/01* (2013.01)

(58) Field of Classification Search
CPC ............ G06K 9/00442; G06K 9/036; G06K 2209/01; G06Q 20/042; G06Q 40/02
USPC ......................................................... 386/224
See application file for complete search history.

(56) References Cited

U.S. PATENT DOCUMENTS 8,688,579 B1 *   4/2014   Ethington .............. G06Q 40/02
                                                          705/35

* cited by examiner

*Primary Examiner* — Thai Tran
*Assistant Examiner* — Jose Mesa
(74) *Attorney, Agent, or Firm* — Sutherland Asbill & Brennan LLP (57) ABSTRACT

Systems and methods are provided for determining check information. According to one or more embodiments, a method may include accessing, by a computer including one or more processors, a video recording of a check. The method may also include determining, based at least in part on the video recording, a plurality of video frames associated with the check. Furthermore, the method may include generating respective optical character recognition (OCR) data associated with the plurality of video frames. Additionally, the method may include determining, based at least in part on the respective OCR data, respective scores associated with the plurality of video frames.

17 Claims, 5 Drawing Sheets

SYSTEMS AND METHODS FOR DETERMINING CHECK INFORMATION

CROSS-REFERENCE TO RELATED APPLICATION

This application claims the benefit of U.S. Provisional Application No. 61/858,371, filed Jul. 25, 2013, entitled "Systems and Methods for Determining Check Information," the contents of which are hereby incorporated by reference.

FIELD OF THE DISCLOSURE

The disclosure generally relates to processing checks, and more particularly relates to determining check information.

BACKGROUND

With the advent of the digital age, online banking and financial transactions have gained prevalence. However, physical checks may still be widely circulated. To this end, financial information written on, or otherwise associated with, the physical checks may be determined and/or identified.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like, but not necessarily the same or identical, elements throughout. Hence, if a feature is used across several drawings, the number used to identify the feature in the drawing where the feature first appeared will be used in later drawings.

DETAILED DESCRIPTION

Overview

Described herein are systems and methods for determining check information. Broadly, the systems and methods described herein may facilitate the determination of check information from a check (e.g., a physical check). In certain embodiments, the check information may be in digital form for digital and/or online processing by a financial system. Thus, one or more user devices may be in communication with a service provider server. As such, the user devices may be configured to record or otherwise access a video recording of a check, such as via an image capturing device. A check application (e.g., stored on the user device, one or more service provider servers, and/or a combination thereof) may be configured to analyze the video recording and determine a plurality of video frames associated with the video recording. In addition, the check application may be configured to perform and/or generate respective optical character recognition (OCR) data for the video frames. To this end, the check application may determine, based at least in part on the respective OCR data, one or more respective scores associated with the video frames. In certain implementations, the check application may select and/or identify the respective video frame associated with the highest score. Based on the OCR data associated with the respective video frame, the check application may determine the check information associated with the check. As such, the check information may be transmitted to the service provider server or any other device for check settlement and/or any other type of processing.

Thus, according to one or more embodiments of the disclosure, a method is provided for determining check information. The method may include accessing, by a computer including one or more processors, a video recording of a check. The method may also include determining, based at least in part on the video recording, a plurality of video frames associated with the check. Furthermore, the method may include generating respective optical character recognition (OCR) data associated with the plurality of video frames. Additionally, the method may include determining, based at least in part on the respective OCR data, respective scores associated with the plurality of video frames.

According to one or more other embodiments of the disclosure, a system is provided. The system may include at least one memory for storing data and computer-executable instructions. The system may also include at least one processor to access the at least one memory and to execute the computer-executable instructions. The at least one processor may be configured to execute the instructions to access a video recording of a check, the video recording comprising a plurality of video frames. The at least one processor may also be configured to execute the instructions to generate respective optical character recognition (OCR) data associated with the plurality of video frames. The at least one processor may further be configured to select a respective video frame from the plurality of video frames. Additionally, the at least one processor may also be configured to execute the instructions to determine, based at least in part on the OCR data associated with the respective video frame, the check information associated with the check.

According to one or more other embodiments of the disclosure, a device is provided. The device system may include at least one memory for storing data and computer-executable instructions. The device system may also include at least one processor to access the at least one memory and to execute the computer-executable instructions. The at least one processor may be configured to execute the instructions to receive, from a user, a selection to video record a check. The at least one processor may also be configured to execute the instructions to generate, by the video camera and based at least in part on the selection, a video recording associated with the check, the video recording comprising a plurality of video frames. The at least one processor may further be configured to transmit the video recording to a service provider computer. Additionally, the at least one processor may be configured to execute the instructions to receive, from the service provider computer, confirmation that the check has been settled.

According to one or more embodiments of the disclosure, a non-transitory computer-readable medium is provided. The non-transitory computer-readable medium may have embodied thereon instructions executable by one or more processors. The instructions may cause the one or more processors to access a video recording of a check, the video recording comprising a plurality of video frames. The instructions may also cause one or more processors to generate respective optical character recognition (OCR) data associated with the plurality of video frames. Furthermore, the instructions may cause the one or more processors to select a respective video frame from the plurality of video frames. Moreover, the instructions may cause the one or more processors to determine, based at least in part on the OCR data associated with the respective video frame, check information associated with the check.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

Figure 1:
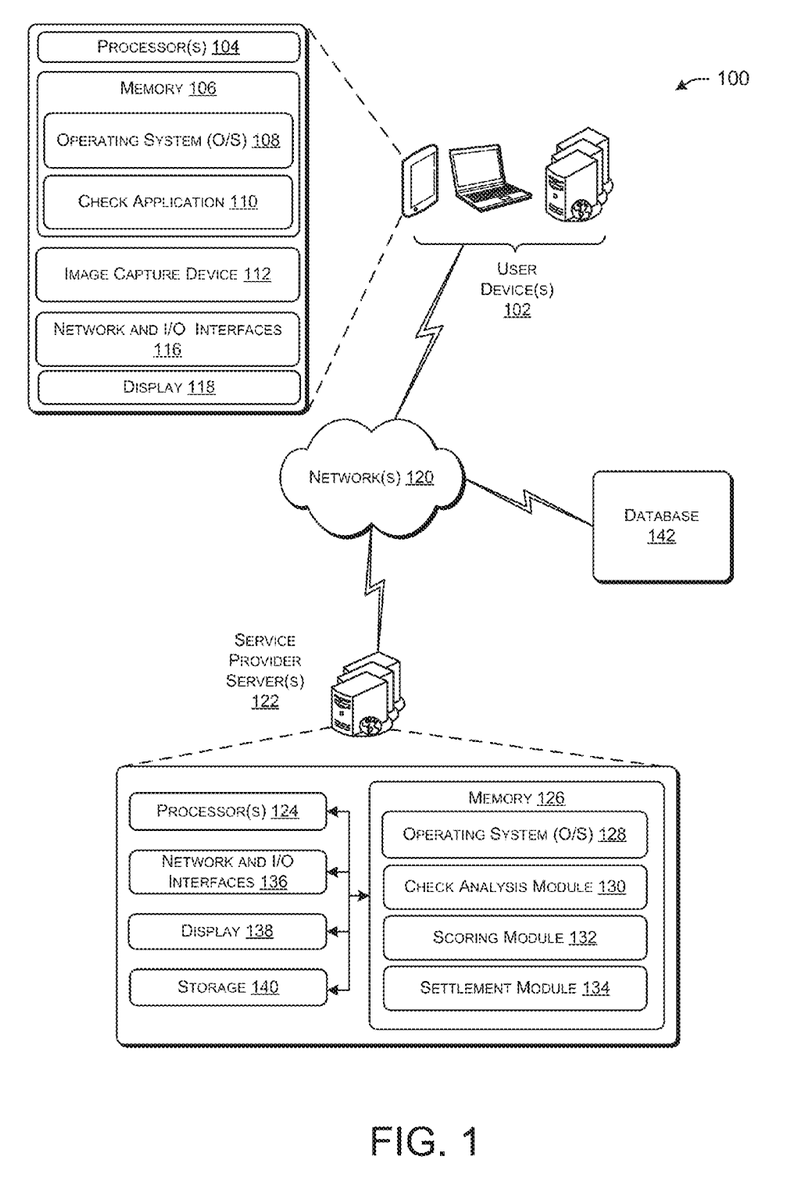
FIG. 1 illustrates a system for determining check information in accordance with one or more example embodiments.

With reference now to FIG. 1, a system 100 for determining check information is shown according to one or more embodiments of the disclosure. The system 100 may include one or more user device(s) 102. In general, the user device 102 may refer to any type of electronic device and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), an automatic teller machine (ATM), or any other electronic device having a networked capability. The user device(s) 102 may include one or more computer processors 104, and a memory 106 storing an operating system 108 and a check application 110. In addition, the user device(s) 102 may include an image capture device 112, network and input/output (I/O) interfaces 116, and a display 118. In certain embodiments, the user device(s) 102 may include one or more sensors capable of gathering information associated with a present environment of the user device(s) 102, or similar hardware devices, such as a camera, a microphone, an antenna, a gesture capture or detection device, or a Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 104 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may include one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the user device 102. The memory 106 may also store content that may be displayed by the user device 102 or transferred to other devices (e.g., headphones) to be displayed or played by the other devices. The memory 106 may also store content received from the other devices. The content from the other devices may be displayed, played, or used by the user device 102 to perform any necessary tasks or operations that may be implemented by the computer processor or other components in the user device 102. Furthermore, the memory 106 may store a check application 110, such as in the operating system 108. The check application 110 is described in more detail below with reference to FIG. 2.

The network and I/O interfaces 116 may also include one or more communication interfaces or network interface devices to provide for the transfer of data between the user device 102 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in Oct. 2010) and/or the IEEE 802.11 wireless standard (see IEEE 802.11-2007, published Mar. 8, 2007; IEEE 802.11n-2009, published Oct. 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the user device 102 and another device, such as an access point, a host computer, a server, a router, a reader device, and the like. The network may include, but is not limited to, the Internet, a private network, a virtual private network, a wireless wide area network, a local area network, a metropolitan area network, a telephone network, and so forth.

The display 118 may include, but is not limited to, a liquid crystal display, a light-emitted diode display, or an E-Ink™ display as made by E Ink Corp. of Cambridge, Massachusetts. The display 118 may be used to show content to a user in the form of text, images, or video. In certain instances, the display 118 may also operate as a touch screen display that may enable the user to initiate commands or operations by touching the screen using certain finger or hand gestures.

The user device(s) 102 may also be in communication with one or more service provider server(s) 122, such as via a network 120. The one or more service provider servers 122 may include one or more processors 124 and at least one memory 126, which may store an operating system 128, a check analysis module 130, a scoring module 132, and a settlement module 134. Furthermore, the one or more service provider servers 122 may include network and I/O interfaces 136, a display 138, and storage 140. In some implementations, the one or more service provider servers 122 may be associated with one or more financial institutions and/or financial systems.

According to one or more embodiments, the check application 110 may be configured to access or otherwise receive a video recording of a check, such as a physical check. A check may include a personal check, a cashier's check, a money order, and/or other types of payment. For example, the check application 110 may generate and/or otherwise provide instructions for the image capture device 112 to generate a video recording of the check. The image capture device 112 may be any device capable of capturing video data, such as a video recording, a camera, and/or the like. In certain implementations, the check application 110 may instruct the image capture device 112 to generate a video recording of a predetermined length (e.g., the predetermined length may be specified by a user of the user device(s) 102). Alternatively, the check application 110 may be configured to receive, from a user, respective selections of when to start and/or stop the image capture device 112 from recording. Once the image capture device 112 has generated the video recording of the check, the check application 110 may be configured to retrieve, receive, and/or otherwise access the video recording from the image capture device 112.

According to certain embodiments, the check application 110 may be configured to provide the video recording to the check analysis module 130 of the one or more service provider servers 122. To this end, the check analysis module 130 may be configured to analyze the video recording to determine one or more video frames associated with the video recording. For example, the check analysis module 130 may be configured to determine how many video frames may be included in the video recording. Furthermore, it will be appreciated that a particular video frame associated with the check may represent an image of the check at a certain point in time. As such, the check analysis module 130 may also be configured to perform optical character recognition (OCR) with respect to one or more of the video frames in the video recording. For instance, the check analysis module 130 may be configured to generate respective OCR data associated with one or more of the video frames.

In some implementations, the check analysis module 130 may provide the OCR data to a scoring module 132. As such, the scoring module 132 may be configured to determine, based at least in part on the OCR data, respective OCR quality scores, ratings, or confidence levels associated with the respective OCR data of the video frames. To this end, a score, a rating, or a confidence level may indicate a quality of the OCR data in which a higher score, rating, or confidence level may indicate a relatively higher quality OCR data and a lower score, rating, or confidence level may indicate a relatively lower quality OCR data. The quality of the OCR data may be determined according to various criteria, such as an image quality, a number of recognized characters, a comparison with a baseline image, ambient light conditions, and/or the like.

Thus, in one example, the check analysis module 130 may be configured to identify a particular video frame, from the video frames included in the video recording of the check, associated with the highest score determined by the scoring module 132. As a result, based at least in part on the OCR data associated with the particular video frame, the check analysis module 130 may be configured to determine check information associated with the check represented by the video frame. In other words, the check analysis module 130 may use the OCR data associated with the highest score (e.g., out of the respective OCR data associated with the video frames) in order to determine the check information. As a result, the check information may be determined with a relatively high reliability and/or accuracy.

According to one or more embodiments, the check analysis module 130 may also be configured to transmit, to the user device(s) 102, an indication of success or failure of performing OCR. For example, if the check analysis module 130 is unable to identify check information from the video recording of the check, the check analysis module 130 may be configured to transmit an error message and/or any other type of failure indication to the user device(s) 102. In certain implementations, the failure indication may also request that the user submit another video recording and/or any other type of image associated with the check to the service provider server(s) 122.

Figure 2:
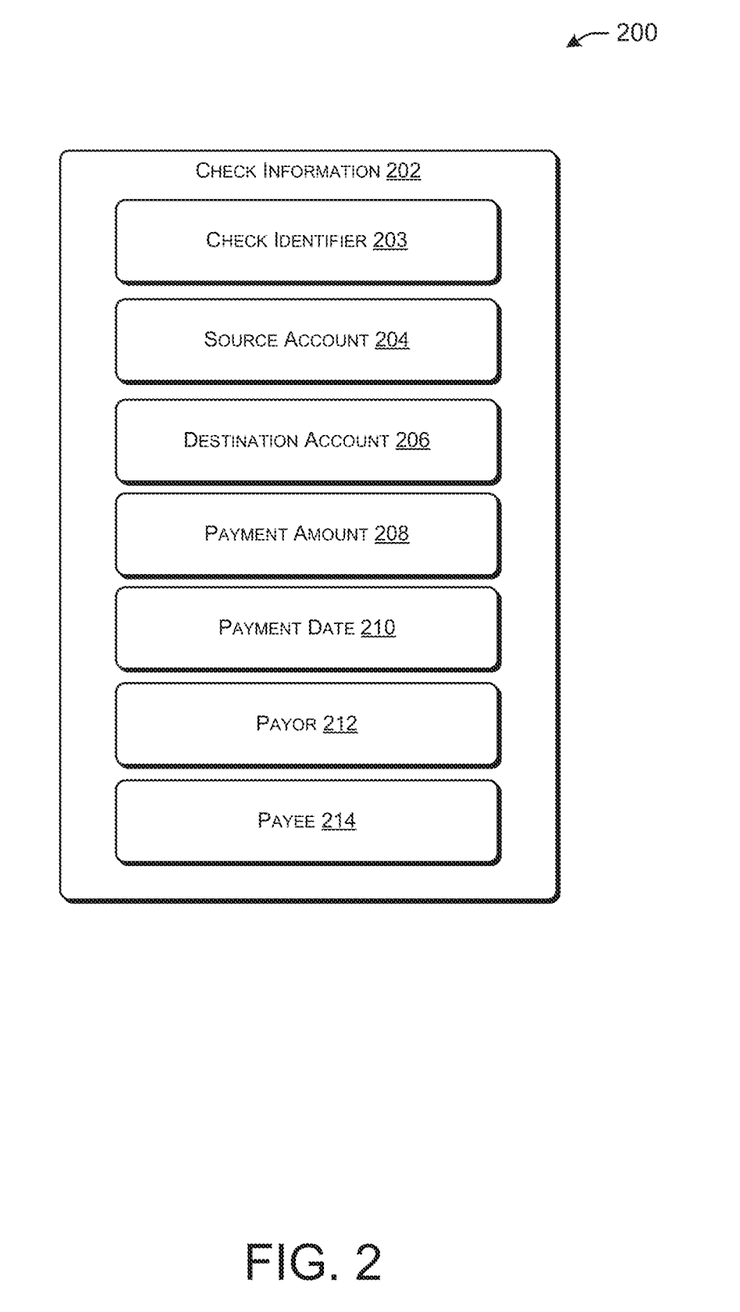
FIG. 2 illustrates a block diagram of check information in accordance with one or more example embodiments.

Referring now to FIG. 2 a block diagram 200 of the check information 202 is provided according to one or more example embodiments. As shown in FIG. 2, the check information 202 may include information associated with a check identifier 203, a source account 204, a destination account 206, a payment amount 208, a payment date 210, a payor 212, and a payee 214. The check identifier 203 may be a check number and/or any other type of indicator configured to identify the check. The source account 204 may include an identifier (e.g., an account number and/or any other type of identifier) associated with a financial account from which to withdraw funds. The destination account 206 may include an identifier (e.g., an account number and/or any other type of identifier) associated with a financial account in which to deposit funds, such as those withdrawn from the source account 204. The payment amount 208 may indicate the quantity or amount of funds to be transferred from the source account 204 to the destination account 206. The payment date 210 may be associated with a date in which the check was created and/or generated. The payor 212 may indicate an entity associated with the source account 204 while the payee 214 may indicate an entity associated with the destination account 206. It will be appreciated that the components of the check information 202 illustrated in FIG. 2 are not limiting or exhaustive, and that the check information 202 may include data associated with checks and other data as well.

According to one or more embodiments, the check analysis module 130 may be configured to transmit and/or otherwise provide the check information 202 to the settlement module 134. The settlement module 134 may be configured to determine, based at least in part on the check information 202, whether payment can be authorized and/or settled. If so, the settlement module 134 may be configured to settle payment of the check accordingly. In certain implementations, the one or more service provider servers 122 may be configured to transmit a confirmation of check settlement to the check application 110 of the user device 102.

While FIG. 1 illustrates the check application 110 as stored in the user device 102, it should be appreciated that the functionality provided by the check application 110 and/or any of its components may be distributed among any combination of devices/components included in the system 100. Similarly, the functionality provided by the one or more service provider servers 122 may also be performed by any device and/or combination of devices included in the system 100. For example, in some implementations, the functionality provided by the check analysis module 130 and/or the scoring module 132 may be performed by the user device 102. As such, the user device 102 and/or the check application 110 may be configured to identify or otherwise determine the video frame of the check associated with the highest scored or rated OCR data, and determine the check information 202 therefrom. The check application 110 may then transmit and/or otherwise provide the check information 202 to the one or more service provider servers 122, which may determine or otherwise facilitate settlement of the check.

Figure 3:
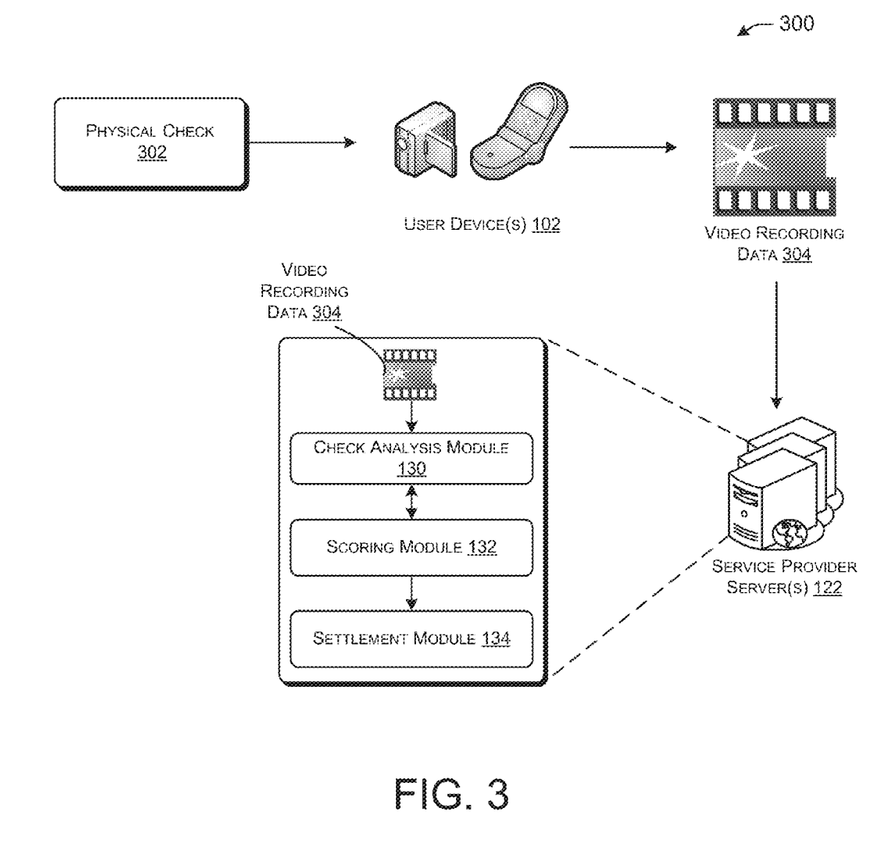
FIG. 3 illustrates a block diagram of a data flow for determining check information in accordance with one or more example embodiments.

Turning now to FIG. 3, a block diagram of a data flow 300 for determining check information is illustrated according to one or more example embodiments. The data flow 300 may include providing and/or identifying a physical check 302. To this end, a user of the user device 102 may provide a selection to a check application 110 included in the user device 102. The selection may instruct the check application 110 to generate a video recording of the physical check 302. Thus, the check application 110 (e.g., via the image capture device 112) may generate video recording data 304 associated with the physical check 302. In certain implementations, the check application 110 may be configured to transmit the video recording data 304 to the one or more service provider servers 122.

According to one or more embodiments, the one or more service provider servers 122 may be configured to receive and/or otherwise access the video recording data 304 (e.g., via the check analysis module 130). To this end, the check analysis module 130 may identify or otherwise determine a plurality of video frames included in the video recording data 304. Moreover, the check analysis module 130 may be configured to generate OCR data associated with the respective video frames of the plurality of video frames. To this end, the scoring module 132 may be configured to generate respective scores associated with the OCR data and/or the respective video frames.

In certain implementations, the check analysis module 130 may be configured to determine the video frame associated with the highest score determined via the scoring module 132. As such, the check analysis module 130 may analyze the OCR data associated with this video frame to determine the check information 202 associated with the physical check 302. Once the check analysis module 130 has determined the check information 202, the check analysis module 130 may transmit the check information 202 to the settlement module 134 in order to settle payment of the physical check 302.

Figure 4:
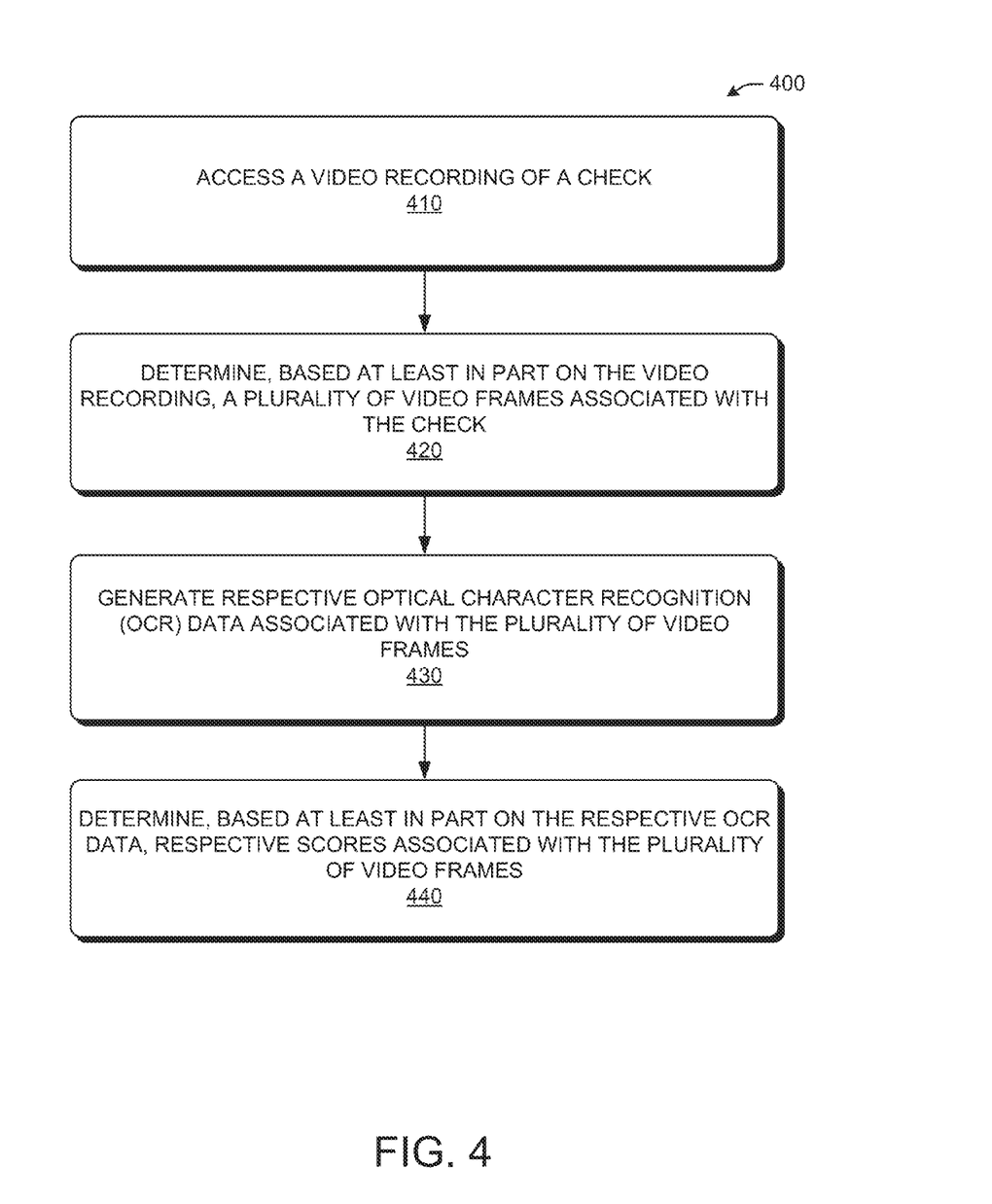
FIG. 4 illustrates a flow diagram of a method for determining check information in accordance with one or more example embodiments.

Turning now to FIG. 4, a flow diagram of a method 400 for determining check information is illustrated according to one or more example embodiments. The method 400 may include block 410, in which a computer, such as a user device 102, one or more service provider servers 122, and/or a combination thereof may access or otherwise receive a video recording and/or video recording data 304 associated with a check. In block 420, the computer may determine, based at least in part on the video recording, a plurality of video frames associated with the check. In block 430, the computer may generate respective OCR data associated with the plurality of video frames, and in block 440, the computer may determine, based at least in part on the respective OCR data, respective scores associated with the plurality of video frames.

Figure 5:
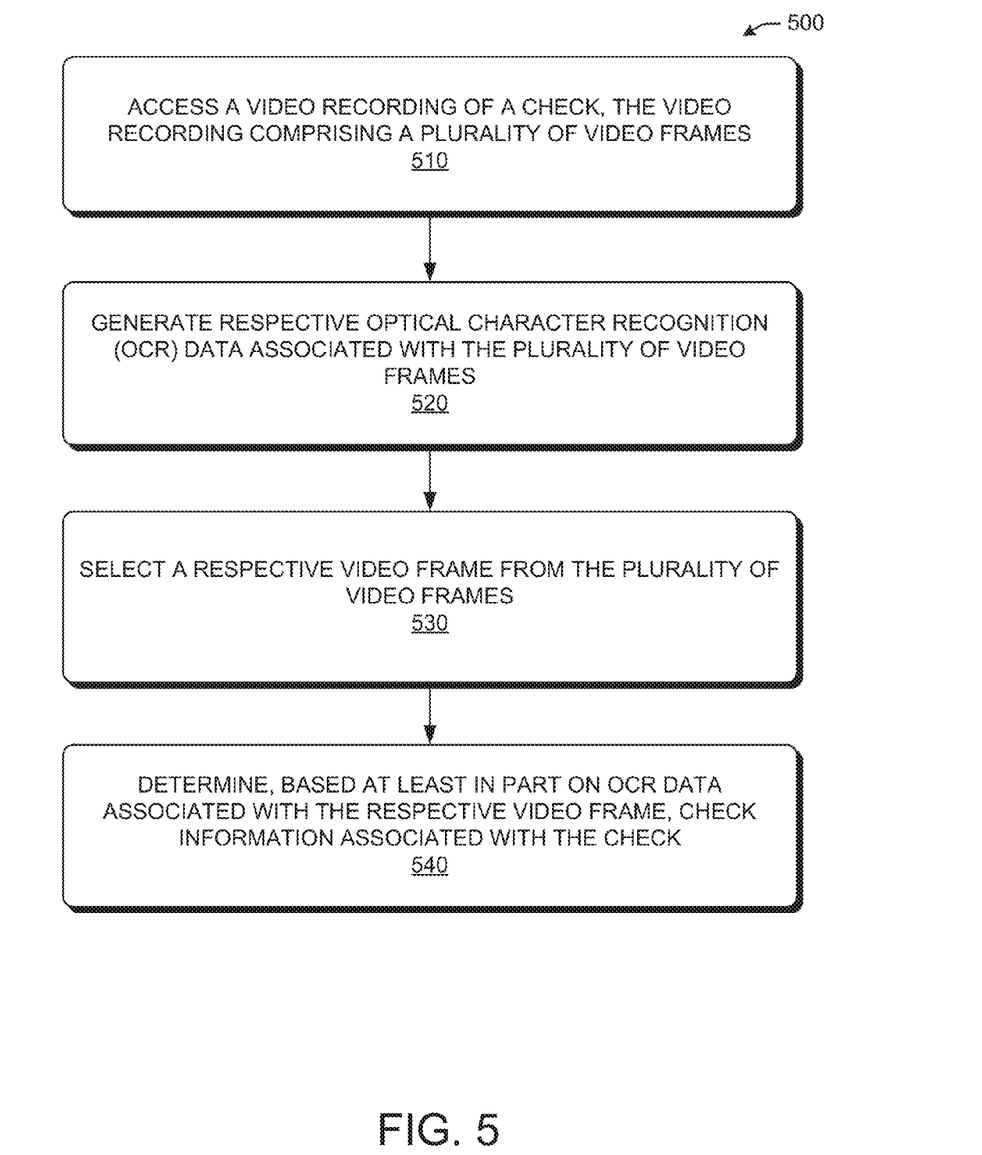
FIG. 5 illustrates a flow diagram of a method for determining check information in accordance with one or more example embodiments.

Turning now to FIG. 5, a flow diagram of a method 500 for determining check information is illustrated according to one or more example embodiments. The method 500 may include block 510, in which a computer, such as a user device 102, a service provider server 122, and/or a combination thereof may access or otherwise receive a video recording of a check. In certain implementations, the video recording may include a plurality of video frames. In block 520, the computer may generate respective OCR data associated with the plurality of video frames. For instance, the computer may perform OCR with the respective one or more of the video frames. In block 530, the computer may select a respective video frame from the plurality of video frames. In block 540, the computer may be configured to determine, based at least in part on the OCR data associated with the respective video frame, check information 202 associated with the check.

It will be appreciated that while FIGS. 1-5 and their descriptions may relate to determining check information, similar processes may also be applied to other forms of payments, identifications, and/or any other types of documents. For example, the check application 110 may also be configured to receive video recording data of a driver's license to determine identification information thereof. To this end, video recording data may be transmitted to the service provider server(s) 122 to analyze one or more included video frames. Such analysis may include performing OCR on one or more of the video frames, and based on the OCR, a respective video frame may be selected. The service provider server(s) 122 may be configured to determine certain identification information from the OCR data of the respective video frame, such as name, birthdate, driver's license number, age, gender, and/or any other type of identification information.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

That which is claimed in certain embodiments is:

1. A method, comprising:
    accessing, by a computer comprising one or more processors, a video recording of a check;
    determining, based at least in part on the video recording, a plurality of video frames associated with the check;
    generating respective optical character recognition (OCR) data associated with the plurality of video frames;
    determining, based at least in part on the respective OCR data, respective scores associated with the plurality of video frames, wherein the respective scores indicate respective OCR data quality associated with the respective OCR data;
    selecting, based at least in part on the respective scores, a respective video frame associated with a highest score out of the respective scores;
    identifying OCR data from the respective video frame associated with the highest score; and
    determining, based at least in part on the identified OCR data, check information associated with the check.

2. The method of claim 1, further comprising:
    processing the check information for settlement of the check.

3. The method of claim 2, wherein the check information comprises information associated with at least one of a check identifier, source account, a destination account, a payor, a payee, an amount, a check number, or a date.

4. The method of claim 1, wherein the respective scores are further determined based at least in part on one or more respective comparisons between the plurality of video frames and a sample check image.

5. The method of claim 1, wherein the respective scores are further determined based at least in part on one or more respective numbers of recognized characters associated with the respective OCR data.

6. The method of claim 1, wherein the computer further comprises an image capturing device to generate the video recording of the check.

7. A system, comprising:
    at least one processor;
        at least one memory storing computer-executable instructions, that when executed by the at least one processors, cause the at least one processor to:
        access a video recording of a check, the video recording comprising a plurality of video frames;
        generate respective optical character recognition (OCR) data associated with the plurality of video frames;
        determine respective quality scores associated with the respective OCR data for each of the plurality of video frames, wherein the respective quality scores indicate respective OCR data quality associated with the respective OCR data;
        select, based at least in part on the respective scores, a respective video frame that is associated with a highest quality score out of the respective quality scores; and
        determine, based at least in part on OCR data associated with the respective video frame, check information associated with the check.

8. The system of claim 7, wherein the computer-executable instructions further comprise instructions to:
    process the check information for settlement of the check.

9. The system of claim 7, wherein the respective scores are determined based at least in part on one or more respective comparisons between the plurality of video frames and a sample check image.

10. The system of claim 7, wherein the respective scores are determined based at least in part on one or more respective numbers of recognized characters associated with the respective OCR data.

11. The system of claim 7, wherein the check information comprises information associated with at least one of a check identifier, source account, a destination account, a payor, a payee, an amount, a check number, or a date.

12. The system of claim 7, wherein the computer-executable instructions further comprise instructions to:

transmit an indication of OCR success or failure to a user device.

13. A non-transitory computer-readable medium storing computer-executable instructions, that when executed by one or more processors, cause the one or more processors to:
access a video recording of a check, the video recording comprising a plurality of video frames;
generate respective optical character recognition (OCR) data associated with the plurality of video frames;
determine respective quality scores associated with the respective OCR data for each of the plurality of video frames, wherein the respective quality scores indicate respective OCR data quality associated with the respective OCR data;
select, based at least in part on the respective scores, a respective video frame that is associated with a highest quality score out of the respective quality scores; and
determine, based at least in part on OCR data associated with the respective video frame, check information associated with the check.

14. The computer-readable medium of claim 13, wherein the computer-executable instructions further comprise instructions to:
process the check information for settlement of the check.

15. The computer-readable medium of claim 13, wherein the respective quality scores are determined based at least in part on one or more respective comparisons between the plurality of video frames and a sample check image.

16. The computer-readable medium of claim 13, wherein the respective quality scores are determined based at least in part on one or more respective numbers of recognized characters associated with the respective OCR data.

17. The computer-readable medium of claim 13, wherein the check information comprises information associated with at least one of a check identifier, a source account, a destination account, a payor, a payee, an amount, a check number, or a date.

* * * * *